(12) United States Patent
Chi et al.

(10) Patent No.: US 11,557,091 B2
(45) Date of Patent: Jan. 17, 2023

(54) TESSELLATION DATA PROCESSING METHOD, SYSTEM, MEDIUM AND VECTOR GRAPHICS PROCESSING DEVICE

(71) Applicants: VeriSilicon Microelectronics (Shanghai) Co., Ltd., Shanghai (CN); VeriSilicon Holdings Co., Ltd., Cayman Islands (KY); VeriSilicon Microelectronics (Nanjing) Co., Ltd., Nanjing (CN)

(72) Inventors: Cheng Chi, Shanghai (CN); Jiangbo Li, Shanghai (CN); Mike M Cai, Newark, CA (US)

(73) Assignees: VeriSilicon Microelectronics (Shanghai) Co., Ltd., Shanghai (CN); VeriSilicon Holdings Co., Ltd., Cayman Islands (KY); VeriSilicon Microelectronics (Nanjing) Co., Ltd., Nanjing (CN)

( * ) Notice: Subject to any disclaimer, the term of this patent is extended or adjusted under 35 U.S.C. 154(b) by 17 days.

(21) Appl. No.: 17/378,805

(22) Filed: Jul. 19, 2021

(65) Prior Publication Data
US 2022/0058867 A1 Feb. 24, 2022

(51) Int. Cl.
*G06T 17/20* (2006.01)
*G06T 1/60* (2006.01)

(52) U.S. Cl.
CPC ............ *G06T 17/20* (2013.01); *G06T 1/60* (2013.01)

(58) Field of Classification Search
CPC ... G06T 17/20; G06T 1/60; G06T 1/20; G06F 12/0811; G06F 16/2237
USPC ........................................................ 345/423
See application file for complete search history.

(56) References Cited

U.S. PATENT DOCUMENTS 7,724,254 B1 * 5/2010 Lorach .................... G06T 15/08
703/2
2017/0091947 A1 * 3/2017 Baruch .................... G06T 7/168

* cited by examiner

*Primary Examiner* — Jennifer Mehmood
*Assistant Examiner* — Kim Thanh T Tran

(57) ABSTRACT

The present disclosure provides a tessellation data processing method, system, media, and vector graphics processing device. The method includes: according to specified coordinates of intersections, creating different levels of cache tables, wherein the intersections result from vector lines generated by tessellation intersecting lines parallel to an x-axis or y-axis; storing in a content table addresses of information tables in memory, storing in a lowest level cache table an address of the content table in the memory, and storing an address of the lowest level cache table in the memory in a cache table one level higher than the lowest level cache table. The tessellation data processing method, system, media, and vector graphics processing device of the present disclosure store effective data in multi-level lookup tables based on coordinates of intersections, effectively reduce memory footprint, support multi-channel tessellation processing, and enhance the performance of vector graphics rendering.

11 Claims, 4 Drawing Sheets according to specified coordinates of intersections, the GPU (or DSP) may create different levels of cache tables in a memory of the vector graphics processing device, including at least a lowest level cache table (i.e., level 1 cache table) and a highest level cache table, wherein the intersections result from vector lines generated by tessellation intersecting lines parallel to an x-axis or y-axis, wherein one of the specified coordinates is an X coordinate or Y coordinate ⎯ S1 the GPU (or DSP) may be configured for storing in a content table addresses of information tables in a memory, storing in the lowest level cache table an address of the content table in the memory, storing an address of the lowest level cache table in the memory in a cache table one level higher than the lowest level cache table; wherein the information table tables store nodes corresponding to the specified coordinates, wherein when the specified coordinates are X coordinates, the nodes are Ynodes, and when the specified coordinates are Y coordinates, the nodes are Xnodes. ⎯ S2

Fig. 1

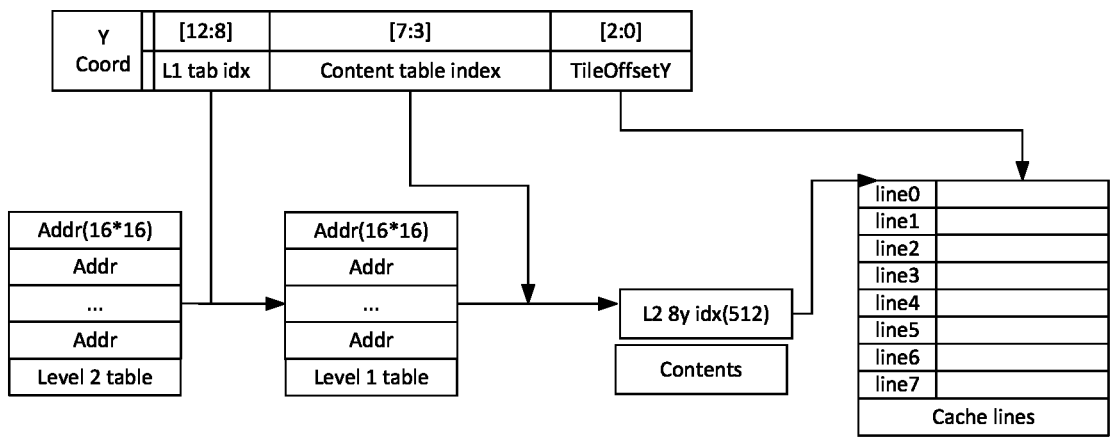

Fig. 2

| Xcoord  | Dir | Cnt     |
|---------|-----|---------|
| subY(0) |    subX(0)  ||
| subY(1) |    subX(1)  ||
| subY(2) |    subX(2)  ||
| subY(3) |    subX(3)  ||

Fig. 3

| y0 | Xnode | Xnode |
|----|-------|-------|
| y1 |       |       |
| y2 |       |       |
| y3 |       |       |
| y4 |       |       |
| y5 |       |       |
| y6 |       |       |
| y7 |       |       |

Fig. 4

| y0 | Addr | F | $xcoord_{max}$ | $xcoord_{min}$ | cnt |
|----|------|---|----------------|----------------|-----|
| y1 |      |   |                |                |     |
| y2 |      |   |                |                |     |
| y3 |      |   |                |                |     |
| y4 |      |   |                |                |     |
| y5 |      |   |                |                |     |
| y6 |      |   |                |                |     |
| y7 |      |   |                |                |     |

Fig. 5

TESSELLATION DATA PROCESSING METHOD, SYSTEM, MEDIUM AND VECTOR GRAPHICS PROCESSING DEVICE

CROSS REFERENCE TO RELATED APPLICATION

The present application claims the benefit of priority to Chinese Patent Application No. CN 2020106928353, entitled "TESSELLATION DATA PROCESSING METHOD, SYSTEM, MEDIUM AND VECTOR GRAPHICS PROCESSING DEVICE", filed with CNIPA on Jul. 17, 2020, the disclosure of which is incorporated herein by reference in its entirety for all purposes.

FIELD OF TECHNOLOGY

The present disclosure relates to a data processing method, in particular to a tessellation data processing method, system, medium, and vector graphics processing device.

BACKGROUND

In the field of vector graphics, lines generated by tessellation may intersect with a certain line parallel to the y-axis, thereby creating intersections, and data associated with the intersections need to be stored in memory. After a current vector graph is processed by tessellation, the intersection data stored in the memory is retrieved. Afterward, a coverage value of each pixel in the vector graph is calculated according to Fill Information and Position Information of the intersections, and then the entire vector graph is redrawn according to filling rules.

Conventionally, the memory used in tessellation stores Fill Information and statistics of all the pixels of the entire vector graph, and therefore tessellation usually generates a large amount of memory footprint. In addition, a large amount of memory footprint makes it difficult for hardware to realize multiple parallel tessellation processes, limiting the hardware's performance.

Further, after the entire vector graph is processed, the data structure in the existing technology requires retrieving all the data in the memory according to their corresponding positions on the vector graph, from top to bottom and from left to right, in order to find all the intersections and perform rendering. The above memory data retrieving method has the following shortcomings:

(1) The bandwidth of the system is relatively large;

(2) It takes a long time to find the intersections, which means an increased bubble time for vector graphics filling, which seriously affects rendering performance.

In addition, in order to reduce interaction with the memory, a cache memory is usually added to cache a part of the data. The hit rate for the conventional cache is low, resulting in large bandwidth required by the system, which decreases performance, and increases power consumption.

SUMMARY

The present disclosure provides a tessellation data processing method, system, media, and vector graphics processing device, which store effective data in multi-level lookup tables based on coordinates of intersections, effectively reduce memory footprint, support multi-channel subdivision curve processing, and enhance the performance of vector graphics rendering.

The method includes: according to specified coordinates of intersections, creating different levels of cache tables, which include at least a lowest level cache table and a highest level cache table, wherein the intersections result from vector lines generated by tessellation intersecting lines parallel to an x-axis or y-axis, wherein one of the specified coordinates is an X coordinate or Y coordinate; storing in a content table addresses of information tables in memory, storing in the lowest level cache table an address of the content table in the memory, and storing an address of the lowest level cache table in the memory in a cache table one level higher than the lowest level cache table. The information table tables store nodes corresponding to the specified coordinates. When the specified coordinates are X coordinates, the nodes are Ynodes, and when the specified coordinates are Y coordinates, the nodes are Xnodes.

In one embodiment of the present disclosure, nodes corresponding to the specified coordinates are stored in a plurality of information tables, and each information table stores part of the nodes corresponding to the specified coordinates.

In one embodiment, each information table stores one or more of the specified coordinates; for each information table, the number of nodes stored therein is determined by the number of the specified coordinates stored therein and a bit width thereof.

In one embodiment, the Xnodes comprises X coordinates, Fill Information, sub-locations, and numbers of sub-locations of intersections, wherein the Ynodes comprises Y coordinates, Fill Information, sub-locations, and numbers of sub-locations of intersections, wherein a sub-location is one of an X sub-location and a Y sub-location.

In one embodiment, the maximum number M of nodes that can be processed by tessellation at a time is customizable; when the number of nodes to be processed is greater than M, vector graphics rendering is performed during a first round for the first M of the nodes to be processed, and then during a second round for the rest of the nodes to be processed; when no such maximum number is set, the rendering of all nodes is performed during one round.

In one embodiment, nodes in each information table are sorted from small to large by corresponding coordinates, wherein in the content table, a first maximum coordinate value or a first minimum coordinate value for nodes is set; when the number of nodes stored reaches M and a coordinate of a newly generated intersection is greater than the first maximum coordinate value, the intersection is discarded; during a next round, the first maximum coordinate value is set to be a second minimum coordinate value, and among newly generated intersections only those whose coordinates are greater than the second minimum coordinate value are processed.

In one embodiment, nodes in each information table are sorted from large to small by corresponding coordinates, wherein in the content table, a first maximum coordinate value or a first minimum coordinate value for nodes is set, wherein when the number of nodes stored reaches M and a coordinate of a newly generated intersection is smaller than the first minimum coordinate value, the intersection is discarded, wherein during a next round, the first minimum coordinate value is set to be a second maximum coordinate value, and among newly generated intersections only those whose coordinates are smaller than the second maximum coordinate value are processed.

In one embodiment, the method further includes: according to a coordinate of an intersection, searching the highest level cache table for an address of a corresponding cache table one level lower than the highest level cache table, and repeating the searching in lower level tables, if any, until the address of the lowest level cache table is obtained.

The method further includes: if a cache table of a certain level is not stored in a cache memory, reading the cache table of the certain level from the memory, and then obtaining an address of a cache table one level lower than the cache table of the certain level from the cache table of the certain level; otherwise directly obtaining the address of the cache table one level lower than the cache table of the certain level from the cache table of the certain level.

The method further includes: if the lowest level cache table is not stored in the cache memory, reading the lowest level cache table from the memory, and then obtaining an address of a corresponding content table address from the lowest level cache table; otherwise obtaining the address of the corresponding content table directly from the lowest level cache table.

The method further includes: if the content table is not in the cache memory, reading the content table from the memory, and then determining whether to discard the intersection according to the content table; otherwise, determining directly whether to discard the intersection according to the content table.

The method further includes: if the intersection is discarded, updating the content table; if the intersection is not discarded, obtaining an address of a corresponding information table; if the information table is not stored in the cache memory, reading the information table from the memory, updating the information table according to information of the intersection, and updating the content table accordingly; otherwise, directly updating the information table according to information of the intersection, and updating the content table accordingly.

The present disclosure also provides a tessellation data processing system applied in vector graphics processing devices, including a setting module, and a storage module.

According to specified coordinates of intersections, the setting module creates different levels of cache tables, which include at least a lowest level cache table and a highest level cache table; the intersections result from vector lines generated by tessellation intersecting lines parallel to an x-axis or y-axis; one of the specified coordinates is an X coordinate or Y coordinate;

The storage module is configured to store in a content table addresses of information tables in memory, to store in the lowest level cache table an address of the content table in the memory, to store an address of the lowest level cache table in the memory in a cache table one level higher than the lowest level cache table; the information table tables store nodes corresponding to the specified coordinates; when the specified coordinates are X coordinates, the nodes are Ynodes, and when the specified coordinates are Y coordinates, the nodes are Xnodes.

The present disclosure also provides a storage medium on which a computer program is stored; when the computer program is executed by a processor, the tessellation data processing method applied in vector graphics processing devices mentioned above is realized.

Finally, the present disclosure provides a vector graphics processing device, including: a processor and memory;

The memory is used for storing computer programs.

The processor is used to execute the computer programs stored in the memory to cause the vector graphics processing device to perform the tessellation data processing method applied in vector graphics processing devices mentioned above.

As described above, the tessellation data processing method, system, medium and vector graphics processing device of the present disclosure vector graphics processing device have the following beneficial effects:

(1) they effectively reduce memory footprint, support multi-channel subdivision curve processing, and enhance the efficiency of tessellation;

(2) they increase the hit rate of the cache memory, which reduces the frequency of reading the memory and reduces bandwidth;

(3) they prevent time wasted on searching for intersections, enhance the performance of vector graphics rendering.

BRIEF DESCRIPTION OF THE DRAWINGS

FIG. 1 shows a flowchart showing various operations of a tessellation data processing method applied in vector graphics processing devices according to an embodiment of present disclosure.

FIG. 2 shows a schematic diagram of a data structure used in tessellation in a vector graphics processing device according to an embodiment of present disclosure.

FIG. 3 shows a data structure of an Xnode according to one embodiment of the present disclosure.

FIG. 4 shows the structure of X node cache lines according to one embodiment of the present disclosure.

FIG. 5 shows a structural diagram of TWS earphones according to one embodiment of the present disclosure.

REFERENCE NUMERALS

Figure 6:
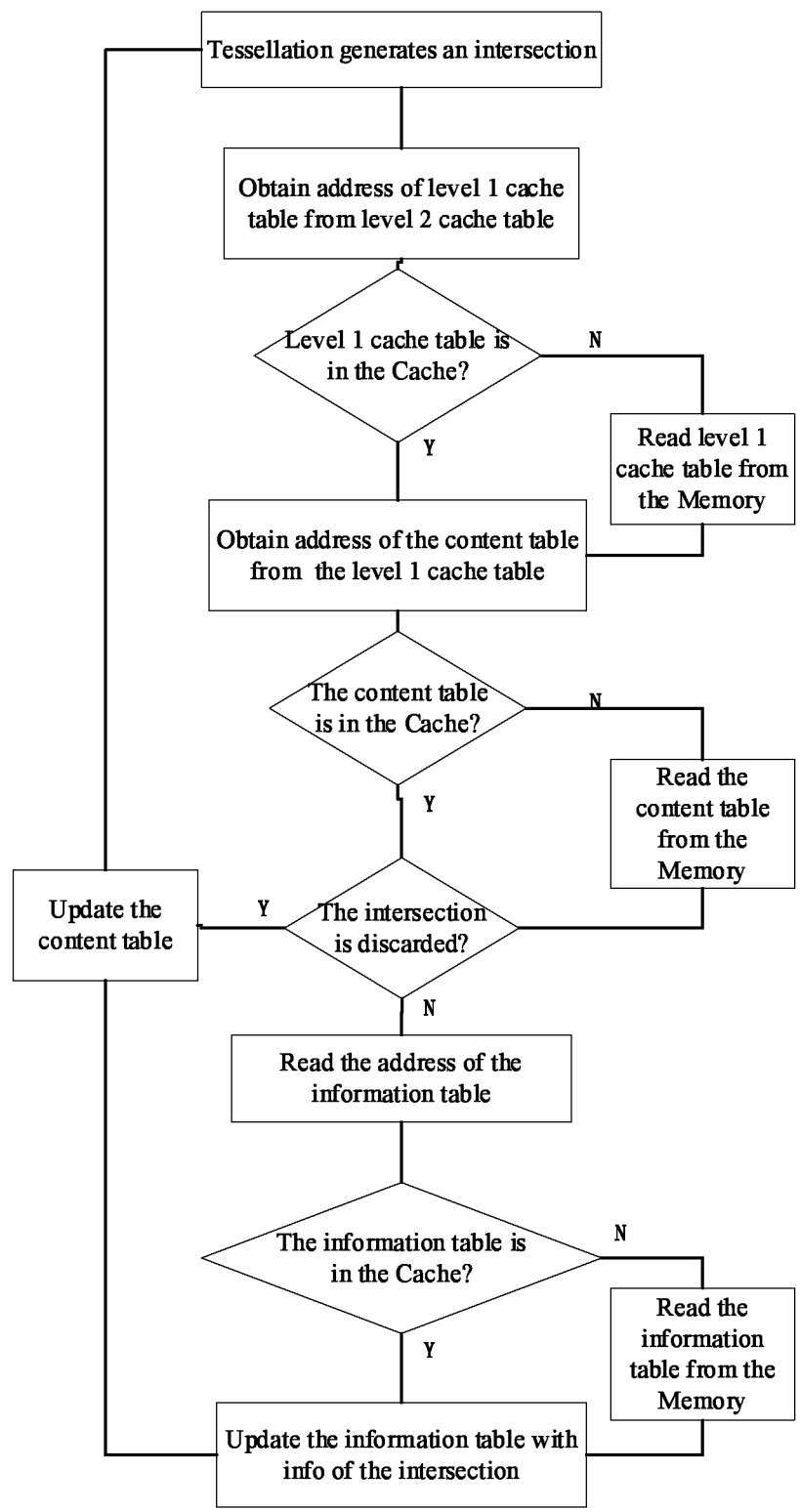
FIG. 6 shows a flowchart showing various operations of a tessellation data processing method applied in vector graphics processing devices according to an embodiment of present disclosure.

| | |
|---|---|
| 71 | setting module |
| 72 | storage module |
| 81 | processor |
| 82 | memory |

DETAILED DESCRIPTION

The following describes the implementation of the present disclosure through specific examples, and those skilled in the art can easily understand other advantages and effects of the present disclosure from the content disclosed in this specification. The present disclosure can also be implemented or applied through other different specific embodiments. Various details in this specification can also be modified or changed based on different viewpoints and applications without departing from the spirit of the present disclosure. It should be noted that the following embodiments and the features in the embodiments can be combined with each other if no conflict will result.

It should be noted that the drawings provided in this disclosure only illustrate the basic concept of the present invention in a schematic way, so the drawings only show the components related to the present invention. The drawings are not necessarily drawn according to the number, shape and size of the components in actual implementation; during the actual implementation, the type, quantity and proportion of each component can be changed as needed, and the components' layout may also be more complicated.

The tessellation data processing method, system, media, and vector graphics processing device of the present disclosure store effective data in multi-level lookup tables based on coordinates of intersections, effectively reduce memory footprint, leaving sufficient memory resources for the system to support multi-channel tessellation processing, effectively improving the system's hardware performance; meanwhile, since nodes of tables are stored based on coordinates, there is no need to search for intersections during rendering, which enhances vector graphics rendering performance of the system.

As shown in FIG. 1, the tessellation data processing method applied in a vector graphics processing device includes the following operations S1 and S2. Specifically, each of the following operations may be performed by a particular graphic processing unit (GPU) or a digital signal processing (DSP) unit in the vector graphics processing device.

In operation S1, according to specified coordinates of intersections, the GPU (or DSP) may create different levels of cache tables in memory of the vector graphics processing device, including at least a lowest level cache table (i.e., level 1 cache table) and a highest level cache table, wherein the intersections result from vector lines generated by tessellation intersecting lines parallel to an x-axis or y-axis, wherein one of the specified coordinates is an X coordinate or Y coordinate;

In some embodiments, when creating the cached tables, only specified coordinates of the intersections are saved in a content table; if no caching table is created, the content table stores all the specified coordinates.

In some embodiments, the intersections are resulted from vector lines generated by tessellation intersecting lines parallel to an x-axis or y-axis, and are stored in one or more levels of look-up tables in the memory of the vector graphics processing device. As shown in FIG. 2, when the specified coordinates are Y coordinates and the different levels of cache tables further include a level 2 cache table, which is one level higher than the level 1 cache table, an address of the level 1 cache table in the memory is stored in the level 2 cache table, and addresses of information tables are stored in the content table.

Specifically, Y coordinates of the intersections include information based on which the level 1 cache table is indexed, and the content table is indexed. Therefore, for an intersection, according to its Y coordinate, its corresponding level 1 cache table and content table can be located based on the level 2 cache table, thereby obtaining an address of a corresponding information table. When the specified coordinates are X coordinates, the corresponding storage mode is the same as the case where the specified coordinates are Y coordinates.

In some embodiments, each information table includes a certain number of Xnodes, each of the Xnodes corresponds to a line parallel to the X-axis, and the line parallel to the X-axis further corresponds to the Y coordinate of an intersection; in some other embodiments, each information table includes a certain number of Ynodes, each of the Xnodes corresponds to a line parallel to the Y-axis, and the line parallel to the Y-axis further corresponds to the X coordinate of an intersection.

As shown in FIG. 3, the Xnodes comprise X coordinates (Xcoord), Fill Information (Info), sub-locations (subY(0), subX(0), subY(1), subX(1), subY(2), subX(2)), and numbers of sub-locations of the intersections (Cnt). A sub-location is one of an X sub-location and a Y sub-location. Accordingly, the Ynodes comprise Y coordinates, Fill Information, sub-locations, and numbers of sub-locations of the intersections, wherein a sub-location is one of an X sub-location and a Y sub-location. In some embodiments, nodes (Xnodes or Ynodes) in the information tables are sorted according to corresponding coordinates. When a tessellation process is completed, effective data can be directly read from the information tables for vector graphics filling, avoiding wasting time on searching for intersections, thereby improving the system's vector graphics rendering performance.

In operation S2, the GPU (or DSP) may be configured for storing in a content table addresses of information tables in memory, storing in the lowest level cache table an address of the content table in the memory, storing an address of the lowest level cache table in the memory in a cache table one level higher than the lowest level cache table; wherein the information table tables store nodes corresponding to the specified coordinates, wherein when the specified coordinates are X coordinates, the nodes are Ynodes, and when the specified coordinates are Y coordinates, the nodes are Xnodes.

In some embodiments, after setting the data structure described above for storing information of intersections generated by tessellation, the system will automatically assign an address to each newly generated intersection, store the information of the newly generated intersection in a corresponding information table according to the coordinates of the intersection, store the address of the information table in the memory in the content table, store the address of the content table in the memory in the level 1 cache table, stored the address of the level 1 cache table in the memory in a cache table one level higher than the level 1 cache table, that is, the level 2 cache table, and similar operations are repeated until the highest level cache table stores the address of a cache table one level lower than it, by which time, the storage of this newly generated intersection is completed.

The initial value of all memory addresses is 0, that is, the memory is empty initially. When an intersection is generated, if its corresponding address of a certain level is 0, a new address will be automatically allocated for information of this newly generated intersection, and its address is stored in multi-level lookup tables, during which process, only effective data are saved, thereby reducing memory footprint, making possible multi-channel parallel tessellation processing.

In one embodiment of the present disclosure, nodes corresponding to the specified coordinates are stored in a plurality of information tables, and each information table stores part of the nodes corresponding to the specified coordinates. The number of specified coordinates stored in each information table is adjustable, and is one or more. For each information table, the number of nodes stored therein is determined by the number of specified coordinates stored therein and a bit width thereof. That is, the present disclosure implements a block-shaped data storage, which, unlike storing addresses of multiple nodes corresponding to a certain coordinate at a time, stores addresses of part of the nodes corresponding to a plurality of coordinates.

Specifically, a vector graphics is drawn continuously; therefore when two intersections are generated next to each other temporally, the values of their X or Y coordinates are also adjacent mathematically. Take for example the case where one cache line occupies 64 Bytes and the resolution is 8K. In order to improve the hit rate of the cache memory, as shown in FIG. 4, a 64 Byte Xnode information table no longer stores one row with 16 Xnodes; instead, it stores eight rows, each of which includes of 2 adjacent Xnodes. Therefore, when processing newly generated intersections, intersections corresponding to these eight rows are continuously generated. In this case, there is no longer the situation where continuous miss may affect and require data from eight 64 Byte cache lines in the information table, and instead, after each miss, one cache line of the information table will be hit, thereby effectively improving cache line hit rate.

In one embodiment of the present disclosure, the maximum number M of nodes that can be processed by tessellation at a time is customizable. In practical applications, the number of intersections for common vector graphics will not be too high in most cases. In order to reduce memory footprint, according to the analysis for actual application scenarios, the maximum number M of nodes processed by a single tessellation process can be set as 16, 32, and the like. In this way, it is possible to reduce data bit width with little to no impact on performance, further reducing tessellation's memory footprint. When the number of nodes to be processed is greater than M (16, for example), during a first round, vector graphics rendering is performed for the first M of the nodes to be processed, and then during a second round, rendering is performed for the rest of the nodes to be processed; when no such maximum number is set, the rendering of all nodes is performed during one round.

In one embodiment, nodes in each information table are sorted from small to large by corresponding coordinates, wherein in the content table, a first maximum coordinate value or a first minimum coordinate value for nodes is set; when the number of nodes stored reaches M and a coordinate of a newly generated intersection is greater than the first maximum coordinate value, the intersection is discarded; during a next round, the first maximum coordinate value is set to be a second minimum coordinate value, and among newly generated intersections only those whose coordinates are greater than the second minimum coordinate value are processed.

Specifically, in one embodiment, the content table shown in FIG. 5 may include several rows, each of which corresponds to an Xnode associated with a line parallel to the X-axis, and stores a corresponding maximum X coordinate value xcoordmax, minimum X coordinate value xcoordmin, identifier F, and number of Xnodes cnt. For each row, xcoordmax represents the maximum value of X coordinates stored in Xnodes included in the information table corresponding to the row; xcoordmin indicates the left boundary of the area that currently requires rendering. For each row, the number of Xnodes cnt represents the number of Xnodes corresponds to the row; F indicates whether the number of X nodes corresponding to the row reaches the maximum number M.

For each row, when the number of nodes stored in the information table corresponds to the row exceeds the maximum number M, and a coordinate of a newly generated intersection is greater than the maximum X coordinate value xcoordmax, the intersection is not processed for the current round and reserved for the next round. This kind of arrangement reduces the frequency of reading the memory. During the next round, the maximum X coordinate value is set to be a new minimum X coordinate value, and among newly generated intersections only those whose X coordinates are larger than the new minimum coordinate value are processed.

In one embodiment, nodes in each information table are sorted from large to small by corresponding coordinates, wherein in the content table, a first maximum coordinate value or a first minimum coordinate value for nodes is set, wherein when the number of nodes stored reaches M and a coordinate of a newly generated intersection is smaller than the first minimum coordinate value, the intersection is discarded, wherein during a next round, the first minimum coordinate value is set to be a second maximum coordinate value, and among newly generated intersections only those whose coordinates are smaller than the second maximum coordinate value are processed.

As shown in FIG. 6, the tessellation data processing method applied in vector graphics processing devices includes the following operations:

according to a coordinate of an intersection, searching the highest level cache table for an address of a corresponding cache table one level lower than the highest level cache table, and repeating the searching in lower level tables, if any, until the address of the lowest level cache table (i.e., the level 1 cache table) is obtained;

if a cache table of a certain level is not stored in a cache memory, reading the cache table of the certain level from the memory, and then obtaining an address of a cache table one level lower than the cache table of the certain level from the cache table of the certain level; otherwise directly obtaining the address of the cache table one level lower than the cache table of the certain level from the cache table of the certain level;

according to the address of the lowest level cache table, if the lowest level cache table is not stored in the cache memory, reading the lowest level cache table from the memory, and then obtaining an address of a corresponding content table address from the lowest level cache table; otherwise obtaining the address of the corresponding content table directly from the lowest level cache table;

according to the address of the content table, if the content table is not in the cache memory, reading the content table from the memory, and then determining whether to discard the intersection according to the content table; otherwise, determining directly whether to discard the intersection according to the content table. Specifically, a determination is made as to whether to process the intersection based on the coordinates of the intersection and a corresponding maximum X coordinate value xcoordmax of the content table. More specifically, if the X coordinate of the intersection is greater than the corresponding maximum X coordinate value xcoordmax, then information of the intersection is discarded; otherwise the information of the intersection is stored.

The method further includes: if the intersection is discarded, updating the content table; if the intersection is not discarded, obtaining an address of a corresponding information table; if the information table is not stored in the cache memory, reading the information table from the memory, updating the information table according to information of the intersection, and updating the content table accordingly; otherwise, directly updating the information table according to information of the intersection, and updating the content table accordingly. Specifically, if the intersection is not discarded, the address of a corresponding information table is acquired from the content table, and the information table is read from the memory or cache memory according to its address.

When a coordinate of the intersection is not the same as any coordinate of the nodes in the information table, that means the intersection is newly generated; then, according to the coordinate of the intersection and the order the nodes are stored in the information table, a node is added to a corresponding position in the information table, which stores the information of the intersection; at the same time, the number of nodes of the information table as reflected in the content table is also updated, that is, the number is added by 1. When a coordinate of the intersection is the same as one of the coordinates in the nodes of the information table, it indicates that the position in the intersection has been crossed by a vector line before, then a node corresponding to the coordinate is updated according to the information of the intersection.

Figure 7:
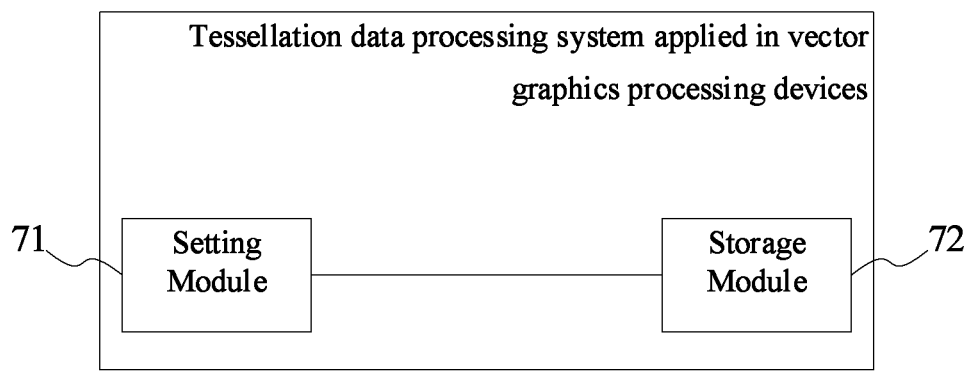
FIG. 7 shows a schematic diagram of a tessellation data processing system applied in vector graphics processing devices according to an embodiment of present disclosure.

As shown in FIG. 7, the tessellation data processing system applied in vector graphics processing devices includes a setting module 71, and a storage module 72, each of which may be a dedicated special-purpose computer processor or electronic module.

According to specified coordinates of intersections, the setting module 71 creates different levels of cache tables, which include at least a lowest level cache table and a highest level cache table; the intersections result from vector lines generated by tessellation intersecting lines parallel to an x-axis or y-axis; one of the specified coordinates is an X coordinate or Y coordinate;

The storage module 72 is connected to the setting module 71, and is configured to store in a content table addresses of information tables in memory, to store in the lowest level cache table an address of the content table in the memory, to store an address of the lowest level cache table in the memory in a cache table one level higher than the lowest level cache table; the information table tables store nodes corresponding to the specified coordinates; when the specified coordinates are X coordinates, the nodes are Ynodes, and when the specified coordinates are Y coordinates, the nodes are Xnodes.

The structure and principle of the setting module 71, and storage module 72 correspond to the operations in the tessellation data processing method applied in vector graphics processing devices.

It needs to be noted that it should be understood that the division of modules of the above device is only a logical function division, and the modules can be fully or partially integrated into a physical entity or physically separated in the actual implementation. In one embodiment, these modules can all be implemented in the form of software called by processing components. In one embodiment, they can also be all implemented in the form of hardware. In one embodiment, some of the modules can also be realized in the form of software called by processing components, and some of the module can be realized in the form of hardware.

For example, a certain module (e.g., setting module 71 or storage module 72) may be a separate processing component, or it may be integrated into a chip of the device, or it may be stored in the memory of the device in the form of programs, and the function of the module may be performed by one or more processing components of the device. The implementation of other modules is similar. In addition, all or part of these modules can be integrated together, or can be implemented separately. The processing component may be an integrated circuit with capability of signal processing. In one implementation, each operation or each module of the above method can be implemented by hardware integrated circuits or software instructions in the processing component.

For example, the above modules can be one or more integrated circuits configured to implement the above methods, such as: one or more Application Specific Integrated circuits (ASICs), or one or more Digital signal processors (DSPs), or one or more Field Programmable Gate Arrays (FPGAs). For another example, when one of the above modules is implemented in the form of processing component calling software, the processing component can be a generic processor, such as a Central Processing Unit (CPU), or another processor that can call programs. Alternatively, these modules can be integrated together and implemented as a System-on-a-chip (SoC).

The present disclosure also provides a storage medium on which a computer program is stored; when the computer program is executed by a processor, the tessellation data processing method applied in vector graphics processing devices mentioned above is realized. The memory may be a ROM, RAM, magnetic disk, flash drive, memory card, optical disk, or other media that can store program codes.

Figure 8:
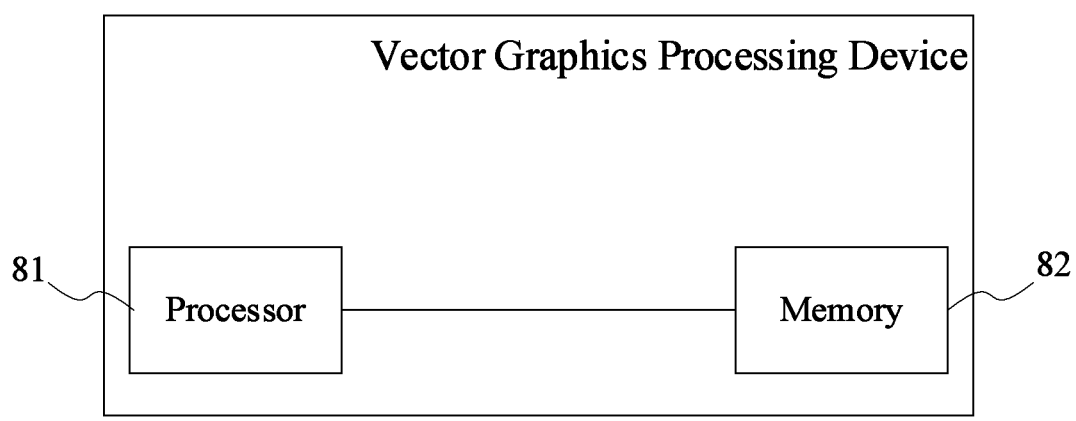
FIG. 8 shows a schematic diagram of a vector graphics processing device according to an embodiment of present disclosure.

As shown in FIG. 8, in one embodiment, a vector graphics processing device of the present disclosure comprises a processor 81 and memory 82.

The memory 82 stores computer programs;

The memory 82 includes one or more of a ROM, RAM, magnetic disk, flash drive, memory card, optical disk, or other media that can store program codes.

The processor 81 is connected to the memory 82, and is used to execute the computer programs stored in the memory to cause the vector graphics processing device to perform the tessellation data processing method applied in vector graphics processing devices mentioned above.

Preferably, the processor 81 can be a general processor, including a Central Processing Unit (CPU), a Network Processor (NP), etc. It can also be a Digital Signal Processor (DSP) or an Application Specific Integrated Circuit (ASIC), a Field Programmable Gate Array (FPGA) or other programmable logic devices, discrete gates or transistor logic devices, discrete hardware components.

In summary, the tessellation data processing method, system, media, and vector graphics processing device of the present disclosure store effective data in multi-level lookup tables based on coordinates of intersections, effectively reduce memory footprint, leaving sufficient memory resources for the system to support multi-channel tessellation processing, effectively improving the system's hardware performance; meanwhile, since nodes of tables are stored based on coordinates, there is no need to search for intersections during rendering, which enhances vector graphics rendering performance of the system. Therefore, the present disclosure effectively overcomes various shortcomings of the prior art and has a high industrial value.

The above-mentioned embodiments only exemplarily illustrate the principles and effects of the present disclosure, but are not used to limit the present disclosure. Anyone familiar with this technology can modify or change the above-mentioned embodiments without departing from the spirit and scope of the present disclosure. Therefore, all equivalent modifications or changes made by those skilled in the art without departing from the spirit and technical concepts disclosed by the present disclosure should still be covered by the attached claims of the present disclosure.

What is claimed is:

1. A tessellation data processing method for processing vector lines in vector graphics processing devices, comprising:

according to specified coordinates of intersections, creating different levels of cache tables, which comprise at least a low level cache table and a high level cache table, wherein the intersections are generated from the vector lines intersecting with tessellation intersecting lines parallel to an x-axis or y-axis, wherein one of the specified coordinates is an X coordinate or Y coordinate;

storing memory addresses of information tables in a content table;

storing memory address of the content table in the low level cache table; and storing memory address of the low level cache table in the high cache table that is at least one level higher than the low level cache table;

wherein the information table tables store nodes corresponding to the specified coordinates, wherein when the specified coordinates are X coordinates, the nodes are Ynodes, and when the specified coordinates are Y coordinates, the nodes are Xnodes.

2. The tessellation data processing method as recited in the claim 1,
wherein nodes corresponding to the specified coordinates are stored in a plurality of information tables, and each information table stores one or more of the nodes corresponding to the specified coordinates.

3. The tessellation data processing method as recited in the claim 2,
wherein for each information table, a specific number of nodes stored therein is determined by a number of the corresponding specified coordinates and a bit width of the information table.

4. The tessellation data processing method as recited in the claim 1,
wherein the Xnodes comprises X coordinates, Fill Information, sub-locations, and numbers of sub-locations of intersections,
wherein the Ynodes comprises Y coordinates, Fill Information, sub-locations, and numbers of sub-locations of intersections, and
wherein a sub-location is one of an X sub-location and a Y sub-location.

5. The tessellation data processing method as recited in the claim 1,
wherein a maximum number M of nodes that can be processed by tessellation at a time is customizable,
wherein when a set of nodes to be processed contains more than M nodes, vector graphics rendering is performed during a first round for the first M of the set of nodes to be processed, and then during a second round for the rest of the set of nodes to be processed,
wherein when no such maximum number M is set, the rendering of all nodes is performed during one round.

6. The tessellation data processing method as recited in the claim 5,
wherein nodes in each information table are sorted from small to large by corresponding coordinates,
wherein in the content table, a first maximum coordinate value or a first minimum coordinate value for nodes is set,
wherein when the number of nodes stored reaches M and a coordinate of a newly generated intersection is greater than the first maximum coordinate value, the intersection is discarded,
wherein during a next round, the first maximum coordinate value is set to be a second minimum coordinate value, and among newly generated intersections only those whose coordinates are greater than the second minimum coordinate value are processed.

7. The tessellation data processing method as recited in the claim 5,
wherein nodes in each information table are sorted from large to small by corresponding coordinates,
wherein in the content table, a first maximum coordinate value or a first minimum coordinate value for nodes is set,
wherein when the number of nodes stored reaches M and a coordinate of a newly generated intersection is smaller than the first minimum coordinate value, the intersection is discarded,
wherein during a next round, the first minimum coordinate value is set to be a second maximum coordinate value, and among newly generated intersections only those whose coordinates are smaller than the second maximum coordinate value are processed.

8. The tessellation data processing method as recited in the claim 1, further comprising:
according to a coordinate of one of the intersections, with respect to the different levels of cache tables, searching the highest level cache table for an address of a corresponding cache table one level lower than the highest level cache table, and repeating the searching in lower level tables, if any, until the address of the lowest level cache table is obtained;
if a cache table of a certain level is not stored in a cache memory, reading the cache table of the certain level from the memory, and then obtaining an address of a cache table one level lower than the cache table of the certain level from the cache table of the certain level; otherwise directly obtaining the address of the cache table one level lower than the cache table of the certain level from the cache table of the certain level;
if the lowest level cache table is not stored in the cache memory, reading the lowest level cache table from the memory, and then obtaining an address of a corresponding content table address from the lowest level cache table; otherwise obtaining the address of the corresponding content table address directly from the lowest level cache table;
if the content table is not in the cache memory, reading the content table from the memory, and then determining whether to discard the intersection according to the content table; otherwise, determining directly whether to discard the intersection according to the content table;
if the intersection is discarded, updating the content table;
if the intersection is not discarded, obtaining an address of a corresponding information table; and
if the information table is not stored in the cache memory, reading the information table from the memory, updating the information table according to information of the intersection, and updating the content table accordingly; otherwise, directly updating the information table according to information of the intersection, and updating the content table accordingly.

9. A tessellation data processing system for processing vector lines in vector graphics processing devices, comprising a setting module, and a storage module;
wherein according to specified coordinates of intersections, the setting module creates different levels of cache tables, which include at least a low level cache table and a high level cache table, wherein the intersections are generated from the vector lines interesting with tessellation intersecting lines parallel to an x-axis or y-axis, wherein one of the specified coordinates is an X coordinate or Y coordinate;

wherein the storage module is configured to store in a content table memory addresses of information tables, to store in the low level cache table an memory address of the content table, and to store memory address of the low level cache table in the high cache table that is one level higher than the low level cache table;

wherein the information table tables store nodes corresponding to the specified coordinates, wherein when the specified coordinates are X coordinates, the nodes are Ynodes, and when the specified coordinates are Y coordinates, the nodes are Xnodes.

10. A storage medium on which a computer program is stored, wherein when the computer program is executed by a processor in a vector graphics processing device, causing the processor to perform a method according to claim 1.

11. A vector graphics processing device, comprising a processor and memory, wherein
the memory stores computer programs,
the processor executes the computer programs stored in the memory to cause the vector graphics processing device to perform the tessellation data processing method applied in vector graphics processing devices according to claim 1.

* * * * *